US009317749B2

(12) United States Patent
Inazumi

(10) Patent No.: US 9,317,749 B2
(45) Date of Patent: *Apr. 19, 2016

(54) COLLISION DETECTION SYSTEM, ROBOTIC SYSTEM, COLLISION DETECTION METHOD AND PROGRAM

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,624

(22) Filed: Jul. 24, 2014

(65) Prior Publication Data

US 2014/0334714 A1    Nov. 13, 2014

Related U.S. Application Data

(63) Continuation of application No. 13/449,578, filed on Apr. 18, 2012, now Pat. No. 8,824,776.

(30) Foreign Application Priority Data

Apr. 21, 2011   (JP) .................................. 2011-094819

(51) Int. Cl.
G06K 9/00   (2006.01)
B25J 9/16   (2006.01)

(52) U.S. Cl.
CPC ........... *G06K 9/00664* (2013.01); *B25J 9/1676* (2013.01); *G05B 2219/49137* (2013.01)

(58) Field of Classification Search
None
See application file for complete search history.

(56) References Cited

U.S. PATENT DOCUMENTS 5,812,138 A    9/1998   Devic
6,559,853 B1   5/2003   Hashimoto et al.
(Continued)

FOREIGN PATENT DOCUMENTS

JP   09-204543      8/1997
JP   2004-303034 A  10/2004
JP   2009-545075 A  12/2009

OTHER PUBLICATIONS

P. Jiménez et al., "Collision Detection Algorithms for Motion Planning", Chapter 6 of "Robot Motion Planning and Control", previously published as "Lectures Notes in Control and Information Sciences 229", Springer, ISBN, 3-540-76219-1, 1998, pp. 305-343.

*Primary Examiner* — Siamak Harandi
(74) *Attorney, Agent, or Firm* — Harness, Dickey & Pierce, P.L.C.

(57) ABSTRACT

A collision detection system includes a processing section, a drawing section, and a depth buffer. Depth information of an object is set to the depth buffer as depth map information. The drawing section performs a first drawing process of performing a depth test, and drawing a primitive surface on a reverse side when viewed from a predetermined viewpoint out of primitive surfaces constituting a collision detection target object with reference to the depth buffer. Further, the drawing section performs a second drawing process of drawing the primitive surface on the reverse side when viewed from a predetermined viewpoint out of the primitive surfaces constituting the collision detection target object without performing the depth test. The processing section determines whether or not the collision detection target object collides with the object on the target side based on the result of the first drawing process and the second drawing process.

14 Claims, 13 Drawing Sheets

(56) References Cited

U.S. PATENT DOCUMENTS

| | | |
|---|---|---|
| 6,677,945 B2 | 1/2004 | Lapidous et al. |
| 7,928,993 B2 | 4/2011 | Sathe et al. |
| 2004/0108999 A1 | 6/2004 | Martin |
| 2010/0161225 A1* | 6/2010 | Hyung ............... G06T 7/2006 701/301 |
| 2011/0244957 A1 | 10/2011 | Nishimura et al. |
| 2011/0311127 A1 | 12/2011 | Mizutani et al. |
| 2012/0209514 A1* | 8/2012 | Chrysanthakopoulos .... 701/431 |

* cited by examiner

COLLISION DETECTION SYSTEM, ROBOTIC SYSTEM, COLLISION DETECTION METHOD AND PROGRAM

CROSS-REFERENCE TO RELATED APPLICATIONS

This is a continuation patent application of U.S. application Ser. No. 13/449,578 filed Apr. 18, 2012, which claims priority to Japanese Patent Application No. 2011-094819, filed Apr. 21, 2011 all of which are expressly incorporated by reference herein in their entireties.

BACKGROUND

1. Technical Field

The present invention relates to a collision detection system, a robotic system, a collision detection method, and a program.

2. Related Art

To determine presence or absence of collision or proximity between objects is required in many field. In the field of, for example, a robot, occurrence of collision causes an extremely significant problem. Therefore, in the past, there has been researched and developed a method of determining presence or absence of the collision or the proximity exceeding an allowable range prior to actual occurrence of the collision using calculation by a computer. As the related art of such a collision determination method, there have been known technologies disclosed in, for example, JP-A-9-204543 (Patent Document 1) and JP-T-2009-545075 (Patent Document 2). The method of Document 1 is shown in the flowchart of FIG. 6 thereof. In the related art described in Document 1, in a device of storing a three-dimensional arrangement of an object as a two-dimensional position composed of lateral (X) and vertical (Y) coordinates, and a depth value (Z value) corresponding to the position, the primitive renders sequentially. Then, if those having the same depth value, namely those occupying three-dimensionally the same position, appear in the rendering process, those are determined as the collision.

The method of Document 2 is explained with reference to FIGS. 2A to 3C thereof. In the related art described in Document 2, the distance from the origin of a polygon to a side of the polygon in a certain direction is previously calculated, and is stored as a cube map. Then, the collision is determined based on the magnitude relation between the distance from the origin to the object to be the target of the collision detection, and the distance stored in the cube map.

However, according to the related art of Document 1, since the update of the depth value depends on the order of drawing the object, omission of the detection of the collision can occur. For example, even if the object disposed on the front side (near side) is drawn, and then the collision occurs between other objects behind (on the back side of) the object thus drawn, since the depth value has already updated to the value of the object on the front side, it results that the collision fails to be detected.

Further, in the related art of Document 2, there is a problem that it is difficult to accurately treat the collision of a non-convex polygon. In other words, since the distance from the origin to the side is stored in the single cube map, it results that in the case in which the polygon has a plurality of sides in a certain direction, namely in the case of such a non-convex polygon, it is not achievable to express the distance as a single cube map.

SUMMARY

According to some aspects of the invention, it is possible to provide a collision detection system, a robotic system, a collision detection method, a program, and so on capable of realizing an accurate collision detection of a collision detection target object.

An aspect of the invention is directed to a collision detection system including a processing section, a drawing section adapted to perform a drawing process, and a depth buffer to which depth information is set, wherein the depth information of an object arranged on a target side is set to the depth buffer as depth map information, the drawing section performs a first drawing process of performing a depth test, and drawing a primitive surface on a reverse side when viewed from a predetermined viewpoint out of primitive surfaces constituting a collision detection target object with reference to the depth map information in the depth buffer, and a second drawing process of drawing the primitive surface on the reverse side when viewed from the viewpoint out of the primitive surfaces constituting the collision detection target object without performing the depth test, and the processing section performs collision determination of determining whether or not the collision detection target object collides with the object on the target side based on a result of the first drawing process and the second drawing process.

According to this aspect of the invention, the depth information of the object arranged on the target surface is set to the depth buffer as the depth map information. Further, the drawing section performs the first drawing process of performing the depth test and then drawing the primitive surface on the reverse side of the collision detection target object, and the second drawing process of drawing the primitive surface on the reverse side of the collision detection target object without performing the depth test. Then, the collision determination between the collision detection target object and the object on the target side is performed based on the result of the first and second drawing processes. According to such a process, it becomes possible to perform the collision determination making effective use of the depth buffer processing, and it becomes possible to realize accurate collision determination of the collision detection target object.

In one aspect of the invention, the processing section may perform a comparison process between a first image generated by the first drawing process and a second image generated by the second drawing process to thereby perform the collision determination.

According to this configuration, it becomes possible to realize the collision determination by detecting the difference between the first and second images respectively generated in the first and second drawing processes.

In one aspect of the invention, the processing section may perform a comparison process between drawn pixel count information in the first drawing process and drawn pixel count information in the second drawing process to thereby perform the collision determination.

According to this configuration, it becomes possible to realize the collision determination only by detecting the difference in the drawn pixel count between the first and second drawing processes.

In one aspect of the invention, the drawing section may draw the primitive surface on the reverse side of the collision detection target object using parallel projection in the viewpoint at infinity in each of the first and second drawing processes.

As described above, by drawing the primitive surface on the reverse side using the parallel projection unlike the typical drawing operation of a three-dimensional image, it becomes possible to realize more accurate collision determination. In one aspect of the invention, the depth information obtained by drawing the object on the target side using the parallel projection in the viewpoint at infinity may be set to the depth buffer as the depth map information of the target side. According to this configuration, it becomes possible to set the depth map information suitable for the process of performing the collision determination by the drawing of the primitive surface using the parallel projection to the depth buffer. In one aspect of the invention, in the case in which the collision detection target object is composed of a plurality of partial objects, and a first partial object and a second partial object out of the plurality of partial objects do not overlap with each other when viewed from the viewpoint, the drawing section may draw the first partial object and the second partial object at the same time in each of the first and second drawing processes.

By drawing the first and second partial objects simultaneously as described above, it becomes possible to reduce the number of times of the drawing process, and it becomes possible to achieve increase in the speed of the process.

In one aspect of the invention, in the case in which a plurality of collision detection target objects exists as the collision detection target object, the processing section may perform the collision determination on a first collision detection target object out of the plurality of collision detection target objects, then set the first collision detection target object to the collision target detection target object, and then perform the collision determination on a second collision detection target object out of the plurality of collision detection target objects.

According to the process described above, it becomes possible to realize not only the collision determination between the collision detection target object and the object on the target side, but also the collision determination between the collision detection target objects in the case in which a plurality of collision detection target objects exists.

In one aspect of the invention, first through N-th (N denotes an integer equal to and greater than two) pieces of depth map information corresponding respectively to the first through N-th target sides, which are set so as to include the collision detection target object in an inside of the first through N-th target sides, may be set to the depth buffer, the drawing section may perform the first drawing process of performing the depth test, and drawing the primitive surface on the reverse side of the collision detection target object with reference to corresponding one of the first through N-th pieces of depth map information, and the second drawing process of drawing the primitive surface on the reverse side of the collision detection target object without performing the depth test on each of the first through N-th target sides, and the processing section may perform the collision determination based on a result of the first drawing process and the second drawing process with respect to each of the first through N-th target sides.

According to this configuration, it becomes possible to set the environmental area including the object corresponding to the collision detection target object inside thereof using the first through N-th target sides to thereby realize the collision determination of the collision detection target object.

In one aspect of the invention, the first through N-th target sides may be sides constituting one of a cubic and a cuboid including the collision detection target object inside.

In one aspect of the invention, the collision detection target object may be an object obtained by modeling a robot.

Another aspect of the invention is directed to a robotic system including either one of the collision detection systems described above.

Still another aspect of the invention is directed to a collision detection method including: setting depth information of an object arranged on a target side to a depth buffer as depth map information, performing a first drawing process of performing a depth test, and drawing a primitive surface on a reverse side when viewed from a predetermined viewpoint out of primitive surfaces constituting a collision detection target object with reference to the depth map information in the depth buffer, performing a second drawing process of drawing the primitive surface on the reverse side when viewed from the viewpoint out of the primitive surfaces constituting the collision detection target object without performing the depth test, and performing collision determination of determining whether or not the collision detection target object collides with the object on the target side based on a result of the first drawing process and the second drawing process.

Yet another aspect of the invention is directed to a program of making a computer function as a system including a processing section, a drawing section adapted to perform a drawing process, and a depth buffer to which depth information is set, wherein the depth information of an object arranged on a target side is set to the depth buffer as depth map information, the drawing section performs a first drawing process of performing a depth test, and drawing a primitive surface on a reverse side when viewed from a predetermined viewpoint out of primitive surfaces constituting a collision detection target object with reference to the depth map information in the depth buffer, and a second drawing process of drawing the primitive surface on the reverse side when viewed from the viewpoint out of the primitive surfaces constituting the collision detection target object without performing the depth test, and the processing section performs collision determination of determining whether or not the collision detection target object collides with the object on the target side based on a result of the first drawing process and the second drawing process.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1A:
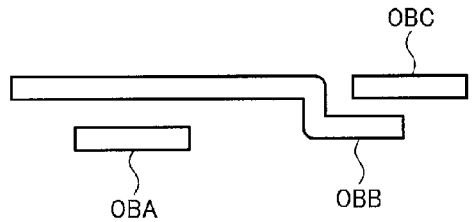
FIGS. 1A through 1C are explanatory diagrams of a depth buffering process.

Hereinafter, a preferred embodiment of the invention will be described in detail. It should be noted that the present embodiment explained below does not unreasonably limit the content of the invention as set forth in the appended claims, and all of the constituents set forth in the present embodiment are not necessarily essential as means of the invention for solving the problems.

1. Depth Buffering Process

In an operation of a robot (a manipulator), a collision with a peripheral structure or peripheral equipment, a self-collision, and a collision with another robot cause an extremely significant problem. In the collision detection method according to the present embodiment, such collisions are detected in advance using a simulation.

The situation in which such a collision detection method according to the present embodiment is used can broadly categorized into an off-line use (prior confirmation) and a use (prediction, look-ahead) in the line time. In the off-line use, in the case in which the circumferential environment is known and static, and the action of the robot is known, the collision is detected when generating the system. On the other hand, in the line time use, in the case in which the circumferential environment and so on vary dynamically (e.g., in the case in which a plurality of robots or an operator exists in the periphery), the collision is detected with a simulation prior to the actual action of the robot.

In the past, as such a collision detection method in the robot, an algorithm suitable for the processing of a central processing unit (CPU) is used in most cases. Here, the algorithm suitable for the CPU processing denotes an algorithm of processing relatively complicated unit processes with relatively small number (in a range of several tens through several hundreds) of parallelism.

However, in recent years, increase in the operating frequency of the CPU has stopped due to the problem of power consumption. Therefore, the recent improvement in the performance of the CPU is realized by improvement in the parallelism of the processing such as progress in multi-core design. In other words, it has become quite difficult to improve the processing performance with the algorithm unachievable to increase the degree of parallelism.

On the other hand, a graphics processing unit (GPU) has an extremely high degree of parallelism compared to the CPU. For example, the current GPU is provided with several hundreds through a thousand and several hundreds of arithmetic logical units (ALU), and has a capacity of executing several tens of thousands through several millions of processes in parallel to each other.

Therefore, in the present embodiment, the higher performance collision detection compared to the past can be realized by adopting an algorism suitable for the GPU processing rather than the CPU processing. Specifically, the function of a rendering output pipeline (ROP), which is a hardware function provided to the GPU, is used to the best effect. In other words, the collision detection is realized by using such a ROP function to make effective use of a depth testing function and a depth buffer.

Here, the depth buffer is used mainly for hidden surface removal in the computer graphics (CG), and is for storing the depth information of an object. Specifically, the depth value (the Z value) is stored pixel-by-pixel. Further, the depth information is the information related to the depth value of each of the pixels. Hereinafter, the depth buffer process (the Z-buffer process) using the depth buffer will be explained. In the depth buffer process, when drawing a certain point, the depth value of the point and the depth value stored in the depth buffer are compared to each other. Then, if the depth value of the point is larger (in the right-handed system), the value of the color buffer is rewritten with the color value of the point, and the value of the depth buffer is updated with the depth value of the point.

Figure 1B:
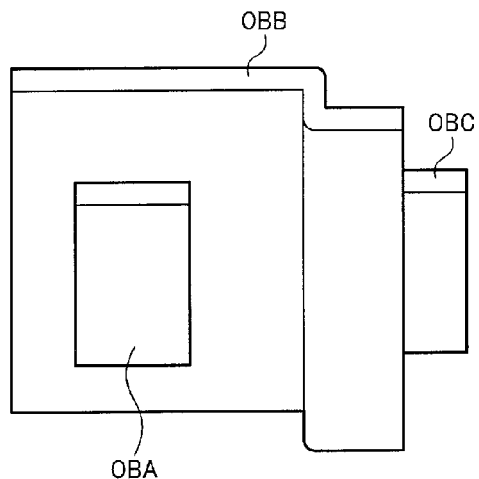

For example, it is assumed that objects OBA, OBB, and OBC are arranged as shown in FIGS. 1A and 1B. FIG. 1A is a diagram showing the objects OBA, OBB, and OBC viewed from a viewpoint located above, and FIG. 1B is a diagram viewed from a viewpoint located obliquely upper front. Here, the objects are formed by modeling objects in the real world, and are each composed of, for example, a plurality of primitive surfaces. The primitive surfaces are surfaces each forming a primitive as a constituent of the object, and are each formed of a polygon, a free-form surface, a subdivision surface, or the like.

Figure 1C:
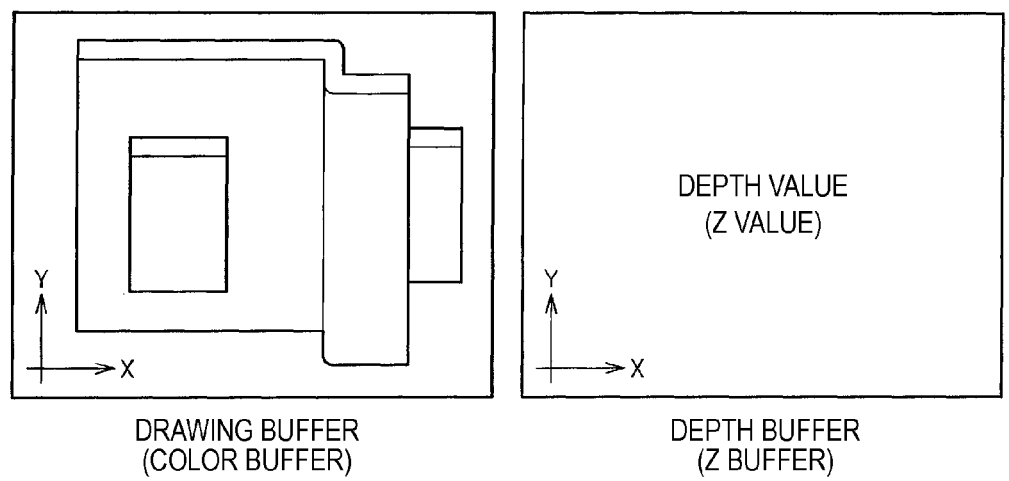

As shown in FIG. 1C, in the drawing process using the depth buffer, the color value (the color information of RGB) of each of the pixels is written to the drawing buffer (the color buffer), and the depth value (the Z value) is written to the depth buffer (the Z buffer).

Figure 2A:
FIGS. 2A through 2D are also explanatory diagrams of the depth buffering process.
Figure 2B:
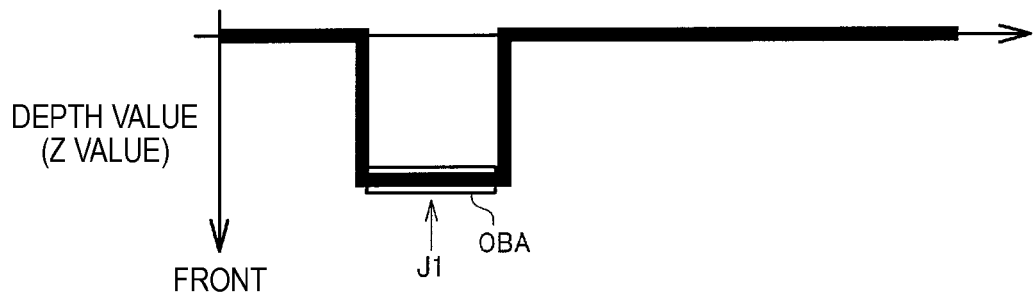

Specifically, in FIG. 2A, the depth value of the depth buffer is set to the rearmost plane value as an initial value. Then, in FIG. 2B, the object OBA is drawn. In this case, the depth value of each of the pixels of the object OBA in the area indicated by J1 in FIG. 2B is arranged to be the depth value corresponding to a position located nearer to the front side (near side) than a position corresponding to the depth value of the depth buffer in FIG. 2A. Therefore, in the area indicated by J1, the color value of the object OBA is written to the drawing buffer, and at the same time, the depth value of the object OBA is written to the depth buffer, and thus the depth value is updated.

Figure 2C:
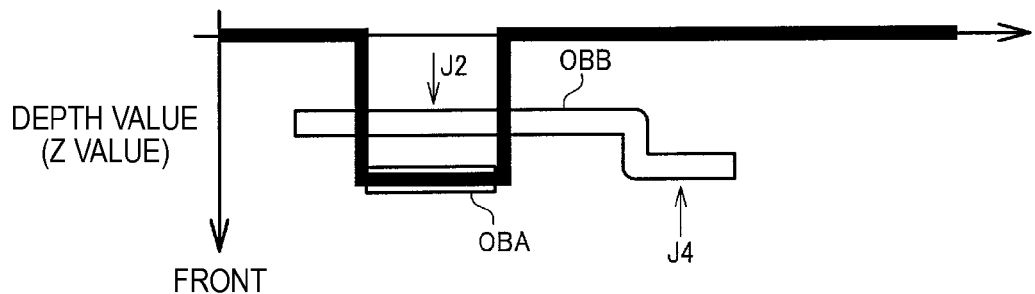
Figure 2D:
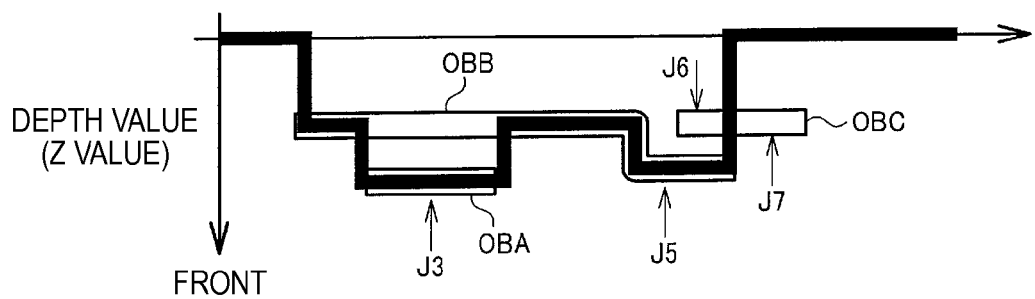

In FIG. 2C, there is drawn the object OBB. In this case, the depth value of each of the pixels of the object OBB in the area indicated by J2 in FIG. 2C is arranged to be the depth value corresponding to a position located nearer to the rear side (back side) than the position corresponding to the depth value of the depth buffer. Therefore, in the area indicated by J2, it is determined that the hidden surface removal has been performed on the object OBB, and the color value of the object OBB is not written to the drawing buffer, and the depth value of the depth buffer is not updated as well as indicated by J3 in FIG. 2D. Meanwhile, the depth value of each of the pixels of the object OBB in the area indicated by J4 is arranged to be the depth value corresponding to a position located nearer to the front side than the position corresponding to the depth value of the depth buffer. Therefore, in the area indicated by J4, the color value of the object OBB is written to the drawing buffer, and at the same time, the depth value of the object OBB is written to the depth buffer to thereby update the depth value as indicated by J5 in FIG. 2D. Then, when the object OBC is drawn in FIG. 2D, the writing of the color value and the update of the depth value are not performed in the area indicated by J6, and the writing of the color value and the update of the depth value are performed due to the method similar to the method described above.

By performing the depth buffer process described above, the order in the depth direction is correctly determined without depending on the order of the drawing, and it becomes possible to generate the image on which the appropriate hidden surface removal has been performed as shown in FIG. 1C.

Figure 3A:
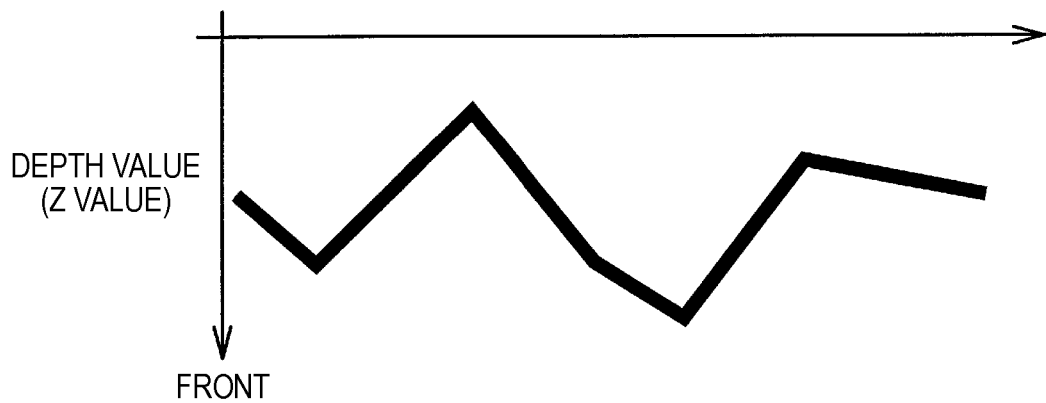
FIGS. 3A through 3C are explanatory diagrams of the problems in the related art.
Figure 3B:
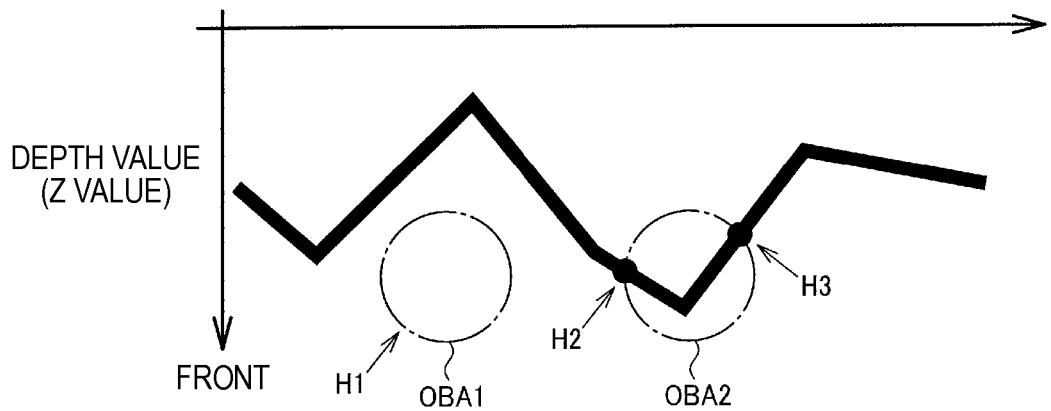

Incidentally, also in the related art in Document 1 described above, the collision determination is performed using the depth buffer. For example, it is assumed that the depth value of the depth buffer has become as shown in FIG. 3A due to the drawing of another object. On this occasion, as indicated by H1 in FIG. 3B, since the object OBA1 has the depth value different from the depth value of the Z buffer, it is determined that the OBA1 does not collide with other objects. In contrast, as indicated by H2, H3, the object OBA2 has the same depth value as the depth value of the depth buffer. Therefore, it is determined that the object OBA2 collides with another object having the depth value of the depth buffer.

Figure 3C:
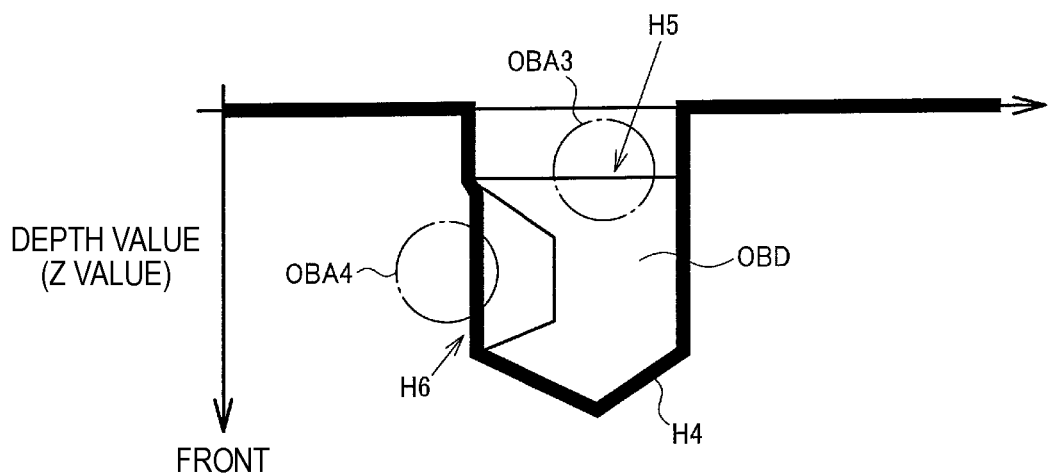

However, the related art of Document 1 has a problem shown in FIG. 3C. In FIG. 3C, the depth value of the depth buffer has become as indicated by H4 due to the drawing of another object OBD. In this case, despite that the object OBA3 collides with the object OBD as indicated by H5, it is determined that the object OBA3 does not collide since the depth value of the object OBA3 does not coincide with the depth value of the depth buffer. Further, in the case in which the depth value is interpolated as indicated by H6, it is determined that the object OBA4 collides with the object OBD despite that it does not collide actually. Further, as another method, it can also be cited a method of setting imaginary viewpoints on a background of a planar object representing the ground or the like, and determining that an object collides with the plane if the object to be located on the obverse side viewed from the background is drawn. However, although a simple plane is imagined in this method, in the case in which the object has a complicated structure (e.g., a non-convex shape) instead of the plane, there is a possibility that the collision with one surface is shielded by another surface, and in such a case, it becomes unachievable to detect the collision.

2. Configuration

Figure 4:
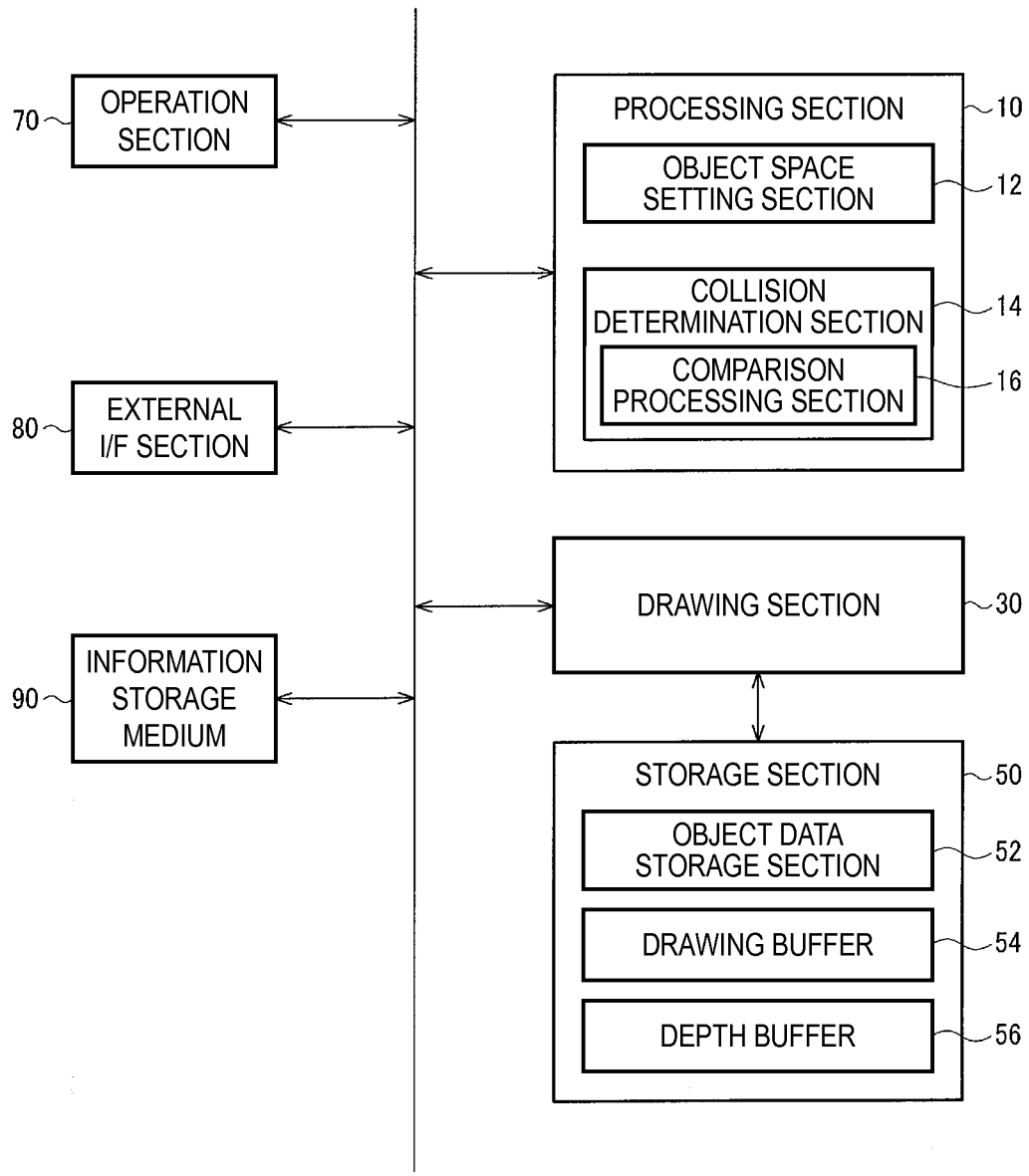
FIG. 4 is a diagram showing a configuration example of a collision detection system according to the present embodiment.

FIG. 4 shows a configuration example of the collision detection system according to the present embodiment capable of solving the problems described above. It should be noted that the configuration of the collision detection system according to the present embodiment is not limited to the configuration shown in FIG. 4, but various practical modifications such as elimination of some of the constituents (e.g., the operating section and the external I/F section) or addition of other constituents are possible.

The collision detection system includes a processing section 10, a drawing section 30 for performing the drawing process, and a storage section 50 (the depth buffer). Further, an operation section 70, an external I/F (interface) section 80, and an information storage medium 90 can also be included. The processing section 10 is for performing a variety of determination processes and control processes, and can be realized by a variety of processors such as a CPU, hardware such as an application specific integrated circuit (ASIC), and a program executed on the processors. The processing section 10 includes an object space setting section 12, and a collision determination section 14.

The object space setting section 12 performs, for example, a process of arranging a plurality of objects in the object space. Specifically, the object space setting section 12 determines the position and the rotational angle of each of the objects in the world coordinate system, and arranges the objects to the respective positions at the respective rotational angles. Here, each of the objects is obtained by modeling a collision detection target such as a robot, or a collision target detection target such as a surrounding structure or peripheral equipment, and is composed of primitive surfaces such as polygons or free-form surfaces.

The collision determination section 14 is for performing a collision determination process between the collision detection target object and the collision target detection target object, and includes a comparison processing section 16 for performing a comparison process of the images and the drawing counts. The drawing section 30 is for performing a drawing process, and can be realized by a variety processors such as a CPU, hardware such as an application specific integrated circuit (ASIC), and a program executed on the processors. The drawing process in the drawing section 30 can also be realized by a vertex shader realized by a vertex shader program, or a pixel shader realized by a pixel shader program. In the vertex shader, there are performed a moving process, a coordinate conversion process, and a clipping process of a vertex. Then, a rasterizing process is performed based on the vertex data on which the vertex processes are performed. Further, in the pixel shader, a pixel process (a fragment process) as a process performed on each pixel (fragment) constituting an image is performed after the rasterizing process has been performed. In other words, the programmable shader process is realized by a shader program described in the shading language.

The storage section 50 forms a work area for the processing section 10, the drawing section 30, and so on, and can be realized by a memory device such as a RAM (e.g., SRAM and DRAM). The storage section 50 includes an object data storage section 52, a drawing buffer 54, and the depth buffer 56.

The object data storage section 52 stores the object data such as position data, rotational angle data, or shape data of the object. The drawing buffer 54 (a color buffer, a frame buffer) is for storing the image information, and specifically stores the image information such as a color value or an α value pixel by pixel. The depth buffer 56 (the Z buffer) is for storing the depth information, and specifically stores the depth value (the Z value) pixel by pixel. The drawing buffer 54 and the depth buffer 56 described above are prepared on the memory constituting the storage section 50 as storage areas.

The operation section 70 is for the user to input various types of operation information. The external I/F section 80 is for performing a wired or wireless communication process of information with an external device. The information storage medium 90 (a computer readable medium) is for storing programs, data, and so on, and the function thereof can be realized by, for example, an optical disc, an HDD, and a memory device. The processing section 10 performs various processes of the present embodiment based on the program (data) stored in the information storage medium 90. Specifically, the information storage medium 90 stores the program (a program for making the computer (the device provided with an operation section, a processing section, a storage section, and an output section) perform the processing of each section) for making the computer function as each section of the present embodiment.

Figure 7:
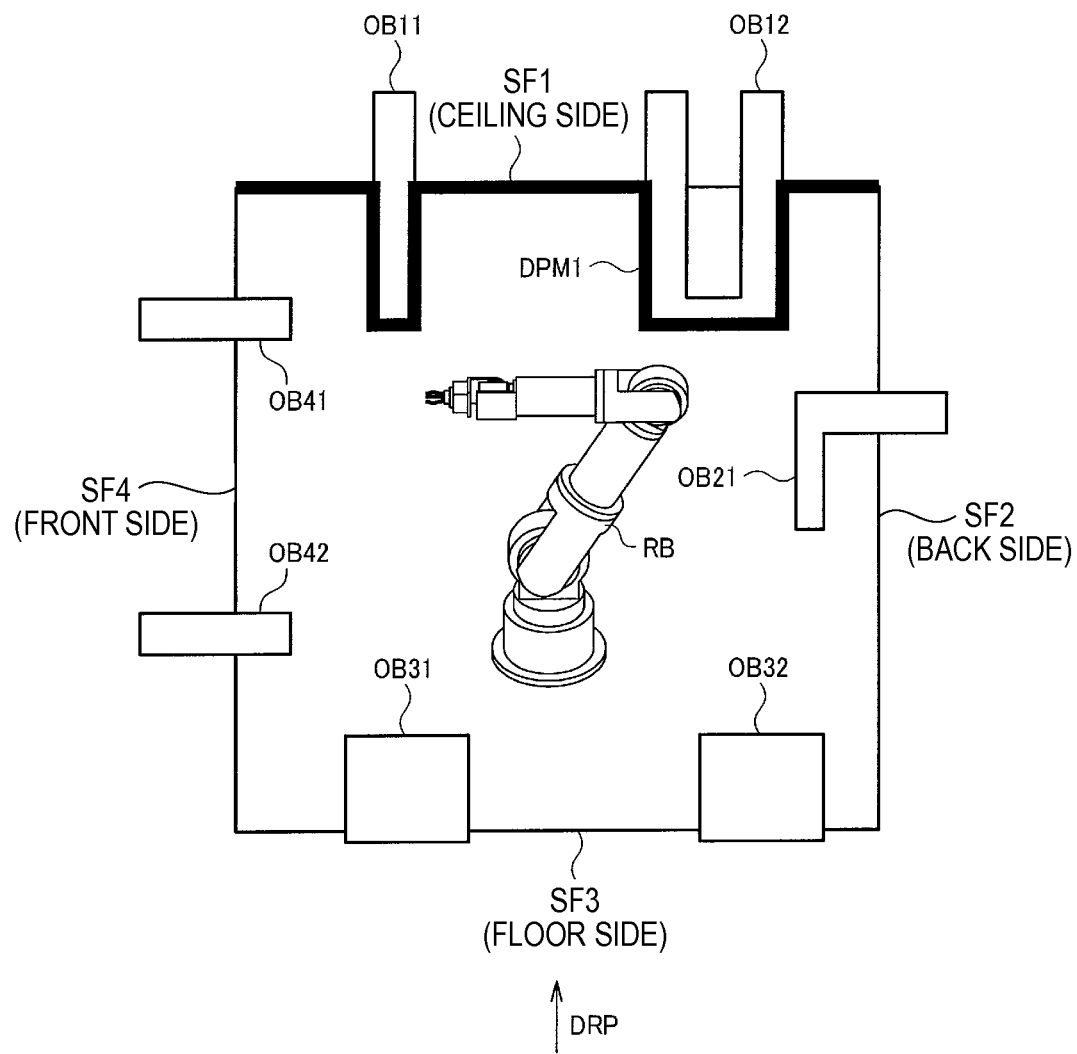
FIG. 7 is an explanatory diagram of depth map information set in accordance with the target side.
Figure 8A:
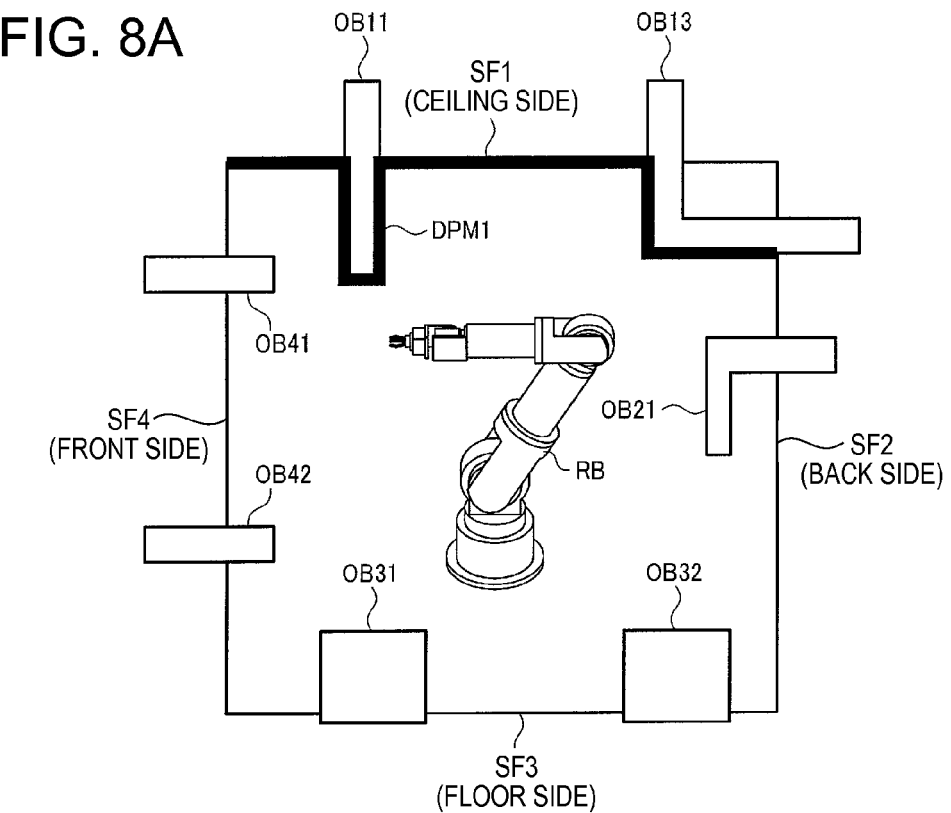
FIGS. 8A and 8B are also explanatory diagrams of the depth map information.
Figure 8B:
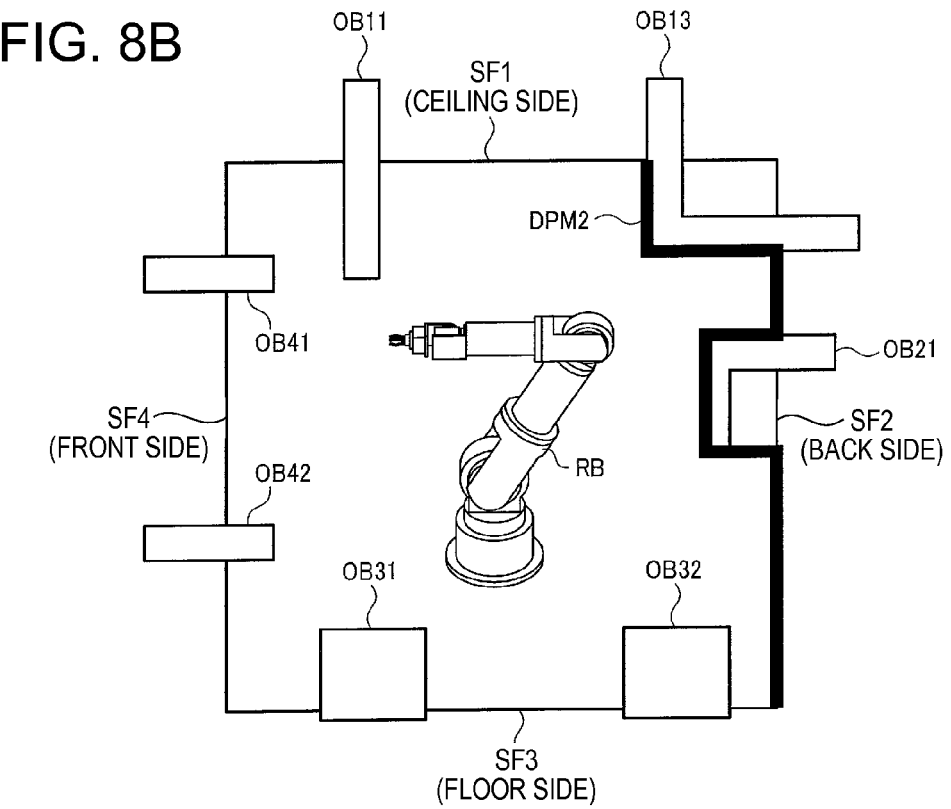

Further, in the collision detection system according to the present embodiment, the depth information of the object arranged on the target side is set (stored) to the depth buffer 56 as the depth map information. As shown in, for example, FIGS. 6 and 9 described later, a plurality of objects (OB11, OB12, OB21, and so on) is arranged on the target sides (SF1 through SF6). Further, as shown in FIGS. 7, 8A, and 8B, the depth information of the objects on the target sides is generated as the depth map information, and is set to the depth buffer 56. The depth map is a map represented by a matrix arrangement of the depth values (the depth values of the respective pixels) of the objects on the target sides viewed from, for example, a predetermined viewpoint (e.g., a viewpoint at infinity).

Here, the target sides are each an imaginary side on which the object corresponding to the collision target detection target is arranged. Further, the depth map information is the information composed of the depth values of the objects on the target side viewed from a predetermined viewpoint when performing, for example, the collision determination process. For example, the depth map is represented by a matrix arrangement of the depth values of the respective pixels of the objects on the target sides viewed from a predetermined viewpoint. Specifically, the depth information which can be obtained by, for example, drawing the object on the target side using the parallel projection in the viewpoint (a predetermined viewpoint in a broad sense) at infinity is set (stored) to the depth buffer 56 as the depth map information of the target side.

Figure 10A:
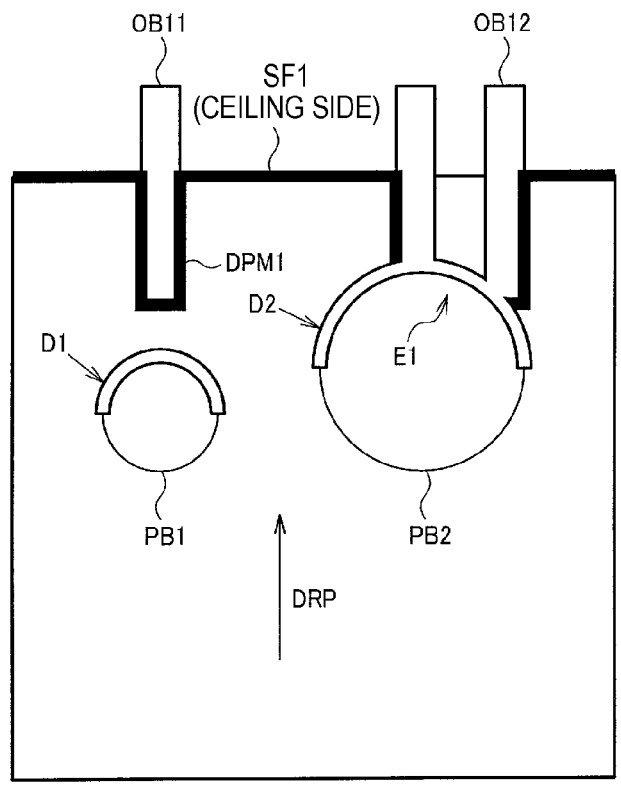
FIGS. 10A through 10C are explanatory diagrams of the collision detection method according to the present embodiment.
Figure 10B:
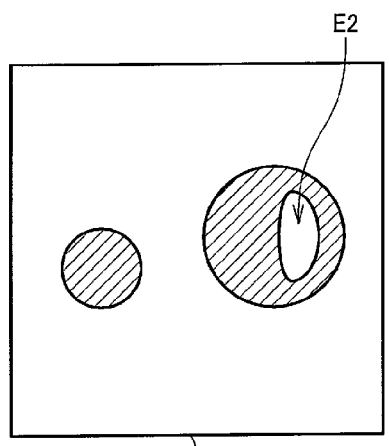
Figure 10C:
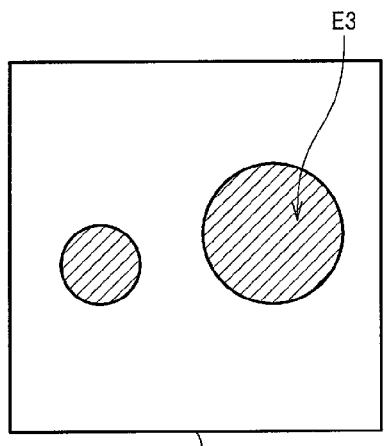

Further, as shown in FIGS. 10A and 10B, the drawing section 30 performs a first drawing process of performing the depth test (while validating the depth test, with the depth test), and then drawing the primitive surface, which is a reverse surface viewed from a predetermined viewpoint (the viewpoint in the drawing process) out of the primitive surfaces (e.g., polygons) constituting the collision detection target object, with reference to the depth map information of the depth buffer 56. Further, as shown in FIG. 10C, the drawing section 30 performs a second drawing process of drawing the primitive surface, which is the reverse surface viewed from the viewpoint, out of the primitive surfaces constituting the collision detection target object without performing the depth test (while invalidating the depth test, without the depth test). Specifically, the drawing section 30 draws the primitive surfaces on the reverse side of the collision detection target object by the parallel projection in the viewpoint at infinity in each of the first and second drawing processes described above.

Here, the collision detection target object is an object to be the collision detection target with the objects on the target side, and is, for example, an object obtained by modeling a robot. Further, taking the case in which the primitive surface is a polygon as an example, the surfaces with the three vertexes constituting a triangle viewed, for example, counter-clockwise from the viewpoint each correspond to an obverse surface (a front surface, a front-facing surface), and those with the three vertexes viewed, for example, clockwise each correspond to a reverse surface (a back surface, a back-facing surface). Assuming that the obverse surfaces of a closed object face outward, it is possible to describe the obverse surface as the front surface, and the reverse surface as the back surface. Further, "to perform the depth test (to validate the depth test)" here denotes that the image information (the color data) is written to the corresponding pixel position in the drawing buffer 54, and at the same time the depth value of the processing target pixel to the corresponding pixel position in the depth buffer 56 if the depth value of the processing target pixel corresponds to the depth value corresponding to a position nearer to the front than a position corresponding to the depth value of the depth buffer 56.

Figure 11A:
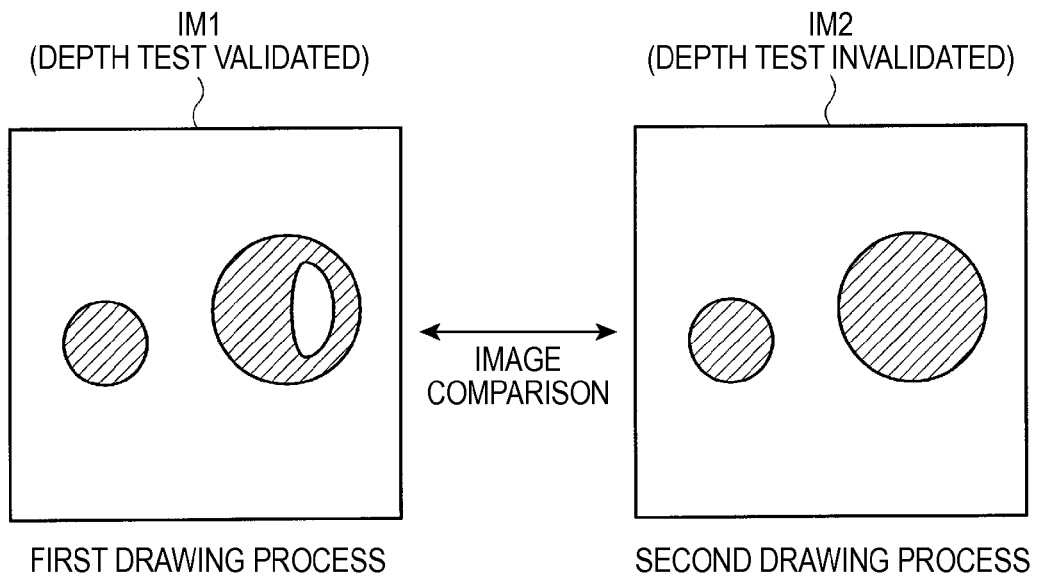
FIGS. 11A and 11B are also explanatory diagrams of the collision detection method according to the present embodiment.
Figure 11B:
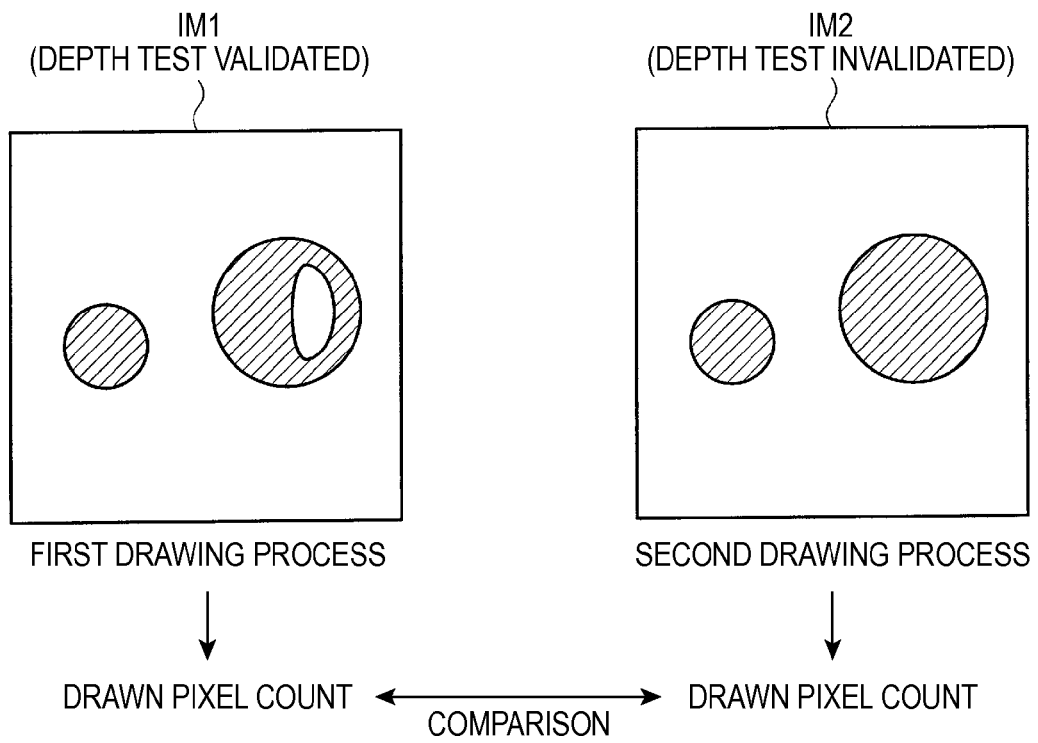

Then, the processing section 10 performs the collision determination for determining whether or not the collision detection target object collides with the object on the target side based on the result of the first drawing process and the second drawing process. Specifically, the processing section 10 performs the collision determination by performing the comparison process between the first image generated by the first drawing process and the second image generated by the second drawing process as shown in FIG. 11A. Alternately, the processing section 10 performs the collision determination by performing the comparison process between the drawn pixel count information in the first drawing process and the drawn pixel count information in the second drawing process as shown in FIG. 11B. The collision determination process is performed by the collision determination section 14. Further, the comparison process between the first and second images and the comparison process of the drawn pixel count information are performed by the comparison processing section 16. It should be noted that the drawn pixel count information is only required to be the information for substantially representing the number of drawn pixels, and includes the information equivalent to the number of drawn pixels.

As described above, in the present embodiment, the first drawing process (the first drawing process with the depth test validated) of setting the depth map information of the target side to the depth buffer and performing the depth test (the Z test), and the second drawing process (the second drawing process with the depth test invalidated) of performing no depth test are performed. Then, the collision determination of the collision detection target object is performed based on the result of the first and second drawing processes. According to such a process, it becomes possible to realize high-speed (accurate) collision determination (proximity determination) making effective use of the depth buffer processing. In other words, by replacing the problem of collision (proximity) with the shielding process suitable for the latest drawing hardware processing, it becomes possible to perform the collision determination at extremely high speed.

It should be noted that the case, in which the collision detection target object is composed of a plurality of partial objects, and a first partial object and a second partial object out of the plurality of partial objects do not overlap with each other when viewed from the viewpoint, is assumed. On this occasion, the drawing section 30 can draw the first partial object and the second partial object simultaneously in each of the first and second drawing processes. In other words, the first and second partial objects are drawn simultaneously like a single partial object. For example, in FIG. 10A described later, the first and second partial objects PB1, PB2 are objects not overlapping with each other when viewed from the viewpoint (the viewpoint of the parallel projection), and in such a case, the first and second partial objects PB1, PB2 are drawn simultaneously like a single partial object. In such a case in which two or more partial objects (two or more parts) of the collision detection target object do not overlap with each other when viewed from the viewpoint as described above, the number of times of the drawing process is reduced and thus the process is made high-speed by drawing them simultaneously. It should be noted that the partial object is the object forming a part constituting the model object such as the collision detection target object. The model object such as the collision detection target object is composed of a plurality of partial objects, joint sections for connecting between the partial objects, and so on.

Further, in the case in which two or more collision detection target objects exist as the collision detection target object, it is also possible for the processing section 10 to perform the collision determination on a first collision detection target object out of the two or more collision detection target objects, then set the first collision detection target object to the collision target detection target object, and then perform the collision determination on the second collision detection target object. In other words, in the case in which the two or more collision detection target objects exist, the collision determination is performed while selecting one collision detection target object to be the target of the collision detection, and treating the other collision detection objects as the objects constituting the environment. According to the process described above, it becomes possible to realize not only the collision determination between the collision detection target object and the environmental object, but also the collision determination between two or more collision detection target objects.

Figure 9:
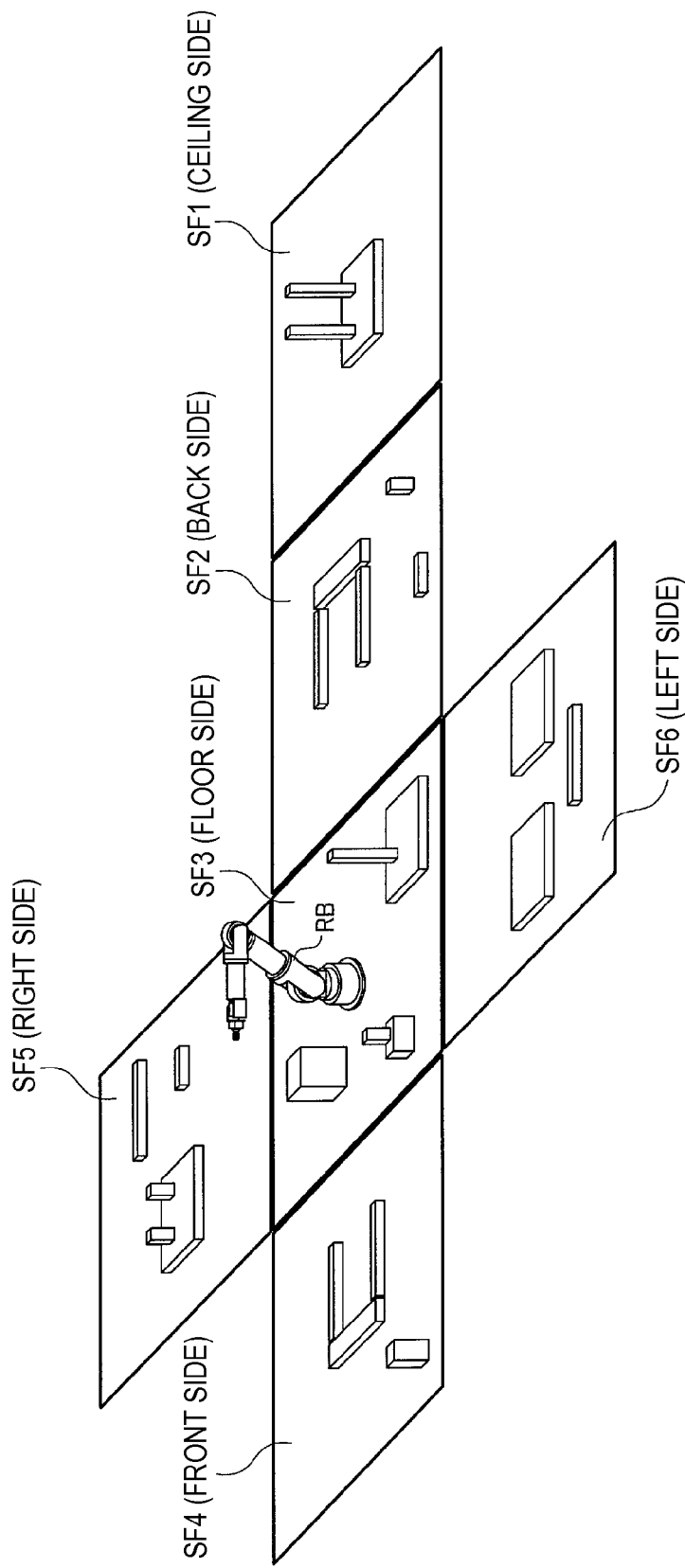
FIG. 9 is an explanatory diagram of a method of setting the 6 sides of depth map information.

Further, it is also possible to set the first through N-th target sides (N denotes an integer equal to or greater than two) so as to include the collision detection target object. For example, in FIG. 9, the six target sides SF1 through SF6 including the robot RB as the collision detection target object in the inside thereof are set. In this case, first through N-th pieces of depth map information corresponding respectively to the first through N-th target sides are set to the depth buffer 56. In other words, the depth information of the object arranged on each of the target sides is set as the depth map information. For example, the depth map information of each of the target sides SF1 through SF6 shown in FIG. 9 is set. The first through N-th target sides on this occasion can be regarded as the planes constituting a cubic or a cuboid including the collision detection target object in the inside thereof, for example. Further, the drawing section 30 performs the first drawing process of performing the depth test (validating the depth test) on each of the first through N-th target sides and then drawing the primitive surfaces on the reverse side of the collision detection target object while referring to the corresponding one of the first through N-th pieces of depth map information (the depth map information corresponding to each of the target sides). Further, the drawing section 30 performs the second drawing process of drawing the primitive surfaces on the reverse side of the collision detection target object without performing the depth test (with the depth test invalidated). For example, regarding the first target side, the drawing section 30 performs the first drawing process while referring to the first depth map information corresponding to the first target side, and at the same time performs the second drawing process. Further, regarding the second target side, the drawing section 30 performs the first drawing process while referring to the second depth map information corresponding to the second target side, and at the same time performs the second drawing process. The same applies to the third through N-th target sides.

Further, the processing section 10 performs the collision determination based on the result of the first drawing process and the second drawing process regarding each of the first through N-th target sides. For example, the processing section 10 performs the collision determination by performing the comparison process between the first and second images respectively generated in the first and second drawing processes and the comparison process of the drawn pixel count information between the first and second drawing processes with respect to each of the target sides. According to the method described above, it becomes possible to realize the collision determination in the environment in which the object is arranged so as to surround the collision detection target with a simple process.

Figure 5:
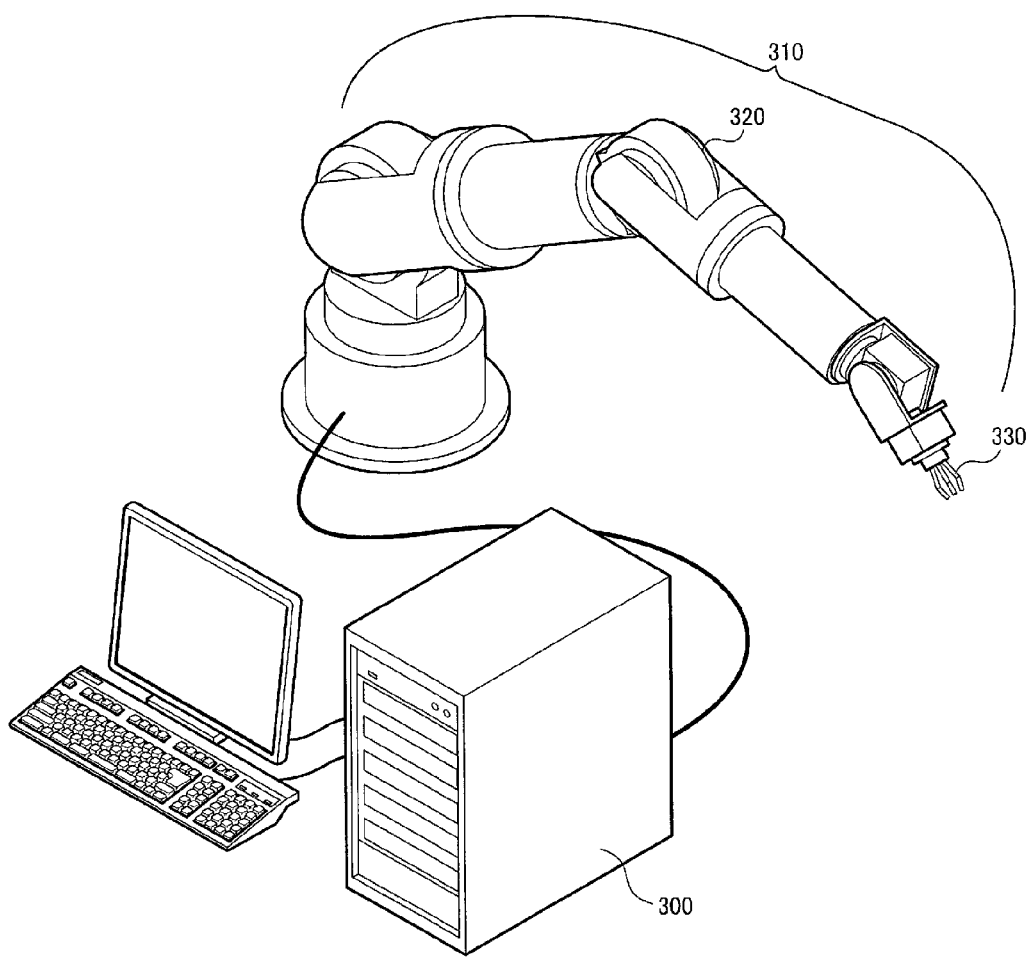
FIG. 5 is a diagram showing an example of a robotic system including the collision detection system according to the present embodiment.

FIG. 5 is a diagram showing an example of a robotic system including the collision detection system according to the present embodiment. This robotic system includes the control device 300 (the information processing device) and a robot 310. The control device 300 performs a control process of the robot 310. Specifically, the control device 300 performs the control of operating the robot 310 based on operation sequence information (scenario information). The robot 310 has an arm 320 and a hand (gripping section) 330. Further, the robot 310 operates based on the operation instruction from the control device 300. For example, the robot 310 performs the operation such as gripping of a work mounted on a pallet not shown or moving. Further, the information such as the posture of the robot and the position of the work is detected based on the pick-up image information obtained by an image pick-up device not shown, and then the information thus detected is transmitted to the control device 300.

The collision detection system according to the present embodiment is disposed in, for example, the control device 300 shown in FIG. 5, and the collision detection system is realized by, for example, the hardware or the program of the control device 300. Further, in the use during the line time, in the case in which the surrounding environment or the like changes dynamically, the collision detection system according to the present embodiment performs the collision determination process using the simulation prior to the actual operation of the robot 310. Further, the control device 300 performs the control of the robot 310 based on the result of the determination process so that the robot does not collide with the surrounding structures, the peripheral equipment, and so on. On the other hand, in the use during the off-line, the collision detection system according to the present embodiment tests the collision using the simulation when creating the operation sequence information and so on. Further, the control device 300 controls the robot 310 based on the operation sequence information (the scenario information) created so as to avoid the collision.

3. Method of Present Embodiment

Then, the method of the present embodiment will be explained in further detail with reference to the drawings. It should be noted that although the case in which the collision detection target object is the object obtained by modeling the robot is hereinafter explained as an example, the method of the present embodiment is not limited thereto.

Figure 6:
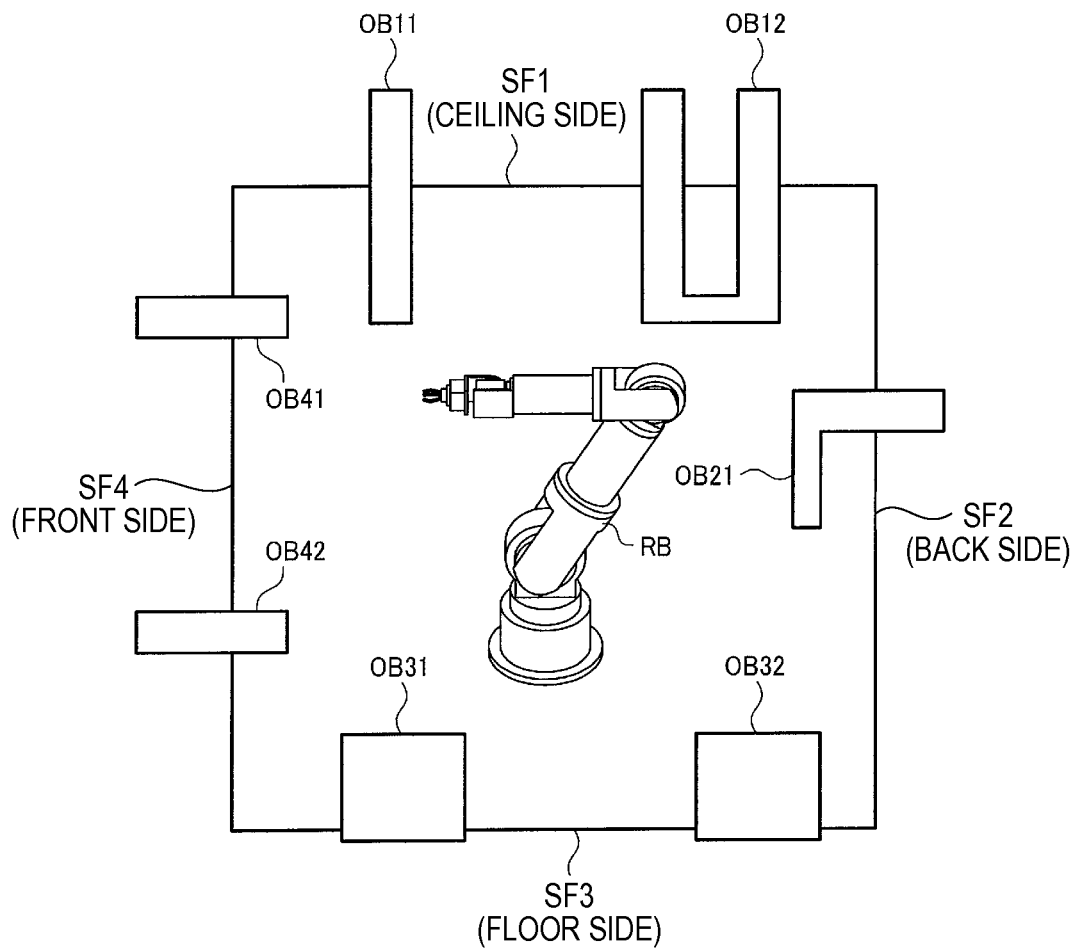
FIG. 6 is an explanatory diagram of the collision detection target object, and objects set on the target side.

In FIG. 6, the reference symbol RB denotes the object obtained by modeling the robot in the real world (hereinafter, the robotic object is simply referred to as a robot RB).

In FIG. 6, the target sides SF1 through SF4 (hereinafter, the target side is simply referred to as a side) including the robot RB in the inside thereof are set. Specifically, as shown in FIG. 9, an imaginary cubic (or cuboid) including the movable range of the robot RB is set. Further, the sides SF1, SF2, SF3, SF4, SF5, and SF6 respectively forms a ceiling side, a back side, a floor side, a front side, a right side, and a left side constituting the imaginary cubic.

Further, in FIG. 6, the objects representing the structures entering the movable range of the robot RB are arranged on the respective sides (the respective target sides). For example, the objects OB11, OB12 are arranged on the side SF1, the objects OB21 is arranged on the side SF2, the objects OB31, OB32 are arranged on the side SF3, and the objects OB41, OB42 are arranged on the side SF4. It should be noted that the non-convex object is treated as a convex object.

Further, as shown in FIG. 7, the depth map information (hereinafter simply referred to as a depth map) of each of the sides using the obverse surface (the front surface, the front-facing surface) of the object penetrating the corresponding side of the cubic. For example, in FIG. 7, the depth map DPM1 of the side SF1 is created using the objects OB11, OB12 penetrating the side SF1. Specifically, the depth information, which is obtained by drawing the objects OB11, OB12 (the obverse surfaces of the objects OB11, OB12) on the side SF1 by the parallel projection (the parallel projection in the direction DRP) in the viewpoint at infinity, becomes the depth map DMP1 of the side SF1. The depth map DMP1 is a map composed of the depth values of the objects OB11, OB12 when viewed from the viewpoint at infinity opposed straight to the side SF1. In other words, the depth map DPM1 of the ceiling side SF1 is expressed as the depth map from the viewpoint at infinity on the floor side SF3 side.

It should be noted that the object penetrating two or more sides is added to the depth maps of the respective sides. For example, in FIGS. 8A and 8B, the object OB13 penetrates both of the sides SF1 and SF2. In this case, the depth value of the object OB13 is set to both of the depth map DPM1 of the side SF1 and the depth map DPM2 of the side SF2. Specifically, as shown in FIG. 8A, by drawing the objects OB11, OB13 using the parallel projection in the direction from the side SF3 to the side SF1, the depth map DPM1 with respect to the side SF1 is created. Further, as shown in FIG. 8B, by drawing the objects OB13, OB21 using the parallel projection in the direction from the side SF4 to the side SF2, the depth map DPM2 with respect to the side SF2 is created. It should be noted that, it is assumed that there is no object of a structure penetrating no sides and floating in the air.

The depth map described above is created for each of the sides SF1 through SF6 shown in FIG. 9. Thus, the depth cube map shown in FIG. 9 is created. The process described above corresponds to the preparation for the collision determination process. Then, one of the sides SF1 through SF6 is selected, and the depth map of the selected side is set to the depth buffer 56. For example, in FIG. 10A, the side SF1 is selected, and the depth map DPM1 of the side SF1 is set to the depth buffer 56. Then, the drawing process of the robot RB will be performed. Here, the robot RB is divided into one or more partial objects (parts) each having a convex shape, and the drawing process of each of these partial objects will be performed. It should be noted that it is assumed that the collision (self collision) between the partial objects will not be considered. In other words, since the positions of these partial objects can be controlled by the control device 300 shown in FIG. 5, it is assumed that the self collision is avoided.

Specifically, the drawing section 30 performs the first drawing process of validating the depth test, and then drawing the partial objects PB1, PB2 of the robot RB. Then, the drawing section 30 records the image thus obtained as a reference image. For example, with reference to the depth values in the depth map DPM1 of the side SF1, the drawing section 30 draws the reverse surfaces (the back surfaces) of the partial objects PB1, PB2 as indicated by D1, D2 in FIG. 10A. Specifically, the drawing section 30 draws the polygons of the reverse surface (the back surface, the back-facing surface) out of the polygons (the primitive surfaces in a broad sense) constituting the partial objects PB1, PB2. Further specifically, the drawing section 30 performs the first drawing process of validating the depth test, and then drawing the reverse surface polygons of the partial objects PB1, PB2 using the parallel projection (from the viewpoint at infinity) in the direction indicated by DRP in FIG. 10A. Due to the first drawing process, the first image shown in FIG. 10B is generated on the drawing buffer 54, and the first image is recorded in, for example, another memory area as the reference image.

Subsequently, the drawing section 30 performs the second drawing process of invalidating the depth test, and then drawing the partial objects PB1, PB2 of the robot RB. Specifically, the drawing section 30 performs the second drawing process of invalidating the depth test, and then drawing the reverse surface polygons of the partial objects PB1, PB2 using the parallel projection. According to the second drawing process, the second image shown in FIG. 10C is generated on the drawing buffer 54. Subsequently, as shown in FIG. 11A, the comparison process between the first image as the reference image obtained by the first drawing process and the second image obtained by the second drawing process is performed. Then, if there is a difference between the first and second images, it is determined that the collision occurs. Specifically, it is determined that the partial objects PB1, PB2 of the robot RB collide with the object on the side SF1.

For example, in the area indicated by E1 in FIG. 10A, the partial object PB2 of the robot RB collides with the object OB12 on the side SF1. In this case, in the area indicated by E1, the object OB12 is located nearer to the front than the reverse surface polygon of the partial object PB2 when viewed from the viewpoint. Therefore, when performing the first drawing process with the depth test validated, the image of the reverse surface polygon of the partial object PB2 is not drawn in the area indicated by E1 in FIG. 10A as indicated by E2 in FIG. 10B. In contrast, in the second drawing process with the depth test invalidated, the reverse surface polygon of the partial object PB2 is drawn without looking up the depth values in the depth map of the side SF1. Therefore, as shown in FIG. 10C, the image of the reverse surface polygon of the partial object PB2 is also drawn in the area indicated by E3. Therefore, the difference occurs between the first and second images respectively generated by the first and second drawing processes, and by detecting the difference between the first and second images as shown in FIG. 11A, it becomes possible to detect the collision.

The process described hereinabove is performed on all of the sides (the target sides) SF1 through SF6 shown in FIG. 9. For example, regarding the side SF2, the first and second drawing processes described above are performed using the parallel projection in the direction from the side SF4 to the side SF2 using the depth map DPM2 exemplified in FIG. 8B. Then, the comparison process between the first and second images thus obtained is performed, and if there is a difference between the first and second images, it is determined that the collision occurs between the robot RB and the object on the side SF2. Substantially the same process is performed on the other sides SF3 through SF6. Then, if no collision is detected in either of the sides SF1 through SF6, the process is terminated with the result that no collision is detected.

As described above, according to the present embodiment, since the collision determination is realized effectively using the depth buffer process, the collision determination process suitable for the latest drawing hardware process with high parallelism can be realized.

Further, for example, in the normal 3D CG, it is common to draw the polygon using the perspective projection in order to generate an image with perspective. Further, it is common that the reverse surface polygons are not drawn in order to reduce the drawing cost using the culling process.

In this regard, in the present embodiment, the depth buffer process is used for the collision determination, but not for generating the 3D CG image. Further, if the drawing process is performed using the perspective projection, there is a possibility that it becomes unachievable to realize the accurate collision determination. Therefore, in the present embodiment, the drawing process is performed using the parallel projection focusing attention on this point. Further, in the 3D CG, by drawing the reverse surface polygons, which are generally eliminated, the collision indicated by E1 in FIG. 10A can successfully be determined by the image comparison shown in FIG. 11A.

It should be noted that although the collision determination is performed by the image comparison in FIG. 11A, the present embodiment is not limited thereto, but can also be those capable of performing the collision determination based at least on the result of the first and second drawing processes.

For example, in FIG. 11B, the collision determination is performed by performing the comparison process between the drawn pixel count in the first drawing process and the drawn pixel count in the second drawing process. For example, when performing the first drawing process, the drawn pixel count set to the drawn pixel counter prepared as hardware is recorded as a reference drawn pixel count. Then, by comparing the reference drawn pixel count in the first drawing process and the drawn pixel count set to the drawn pixel counter in the second drawing process with each other, the collision is determined. For example, if the collision occurs, since the drawn pixel count in the first drawing process becomes smaller than the drawn pixel count in the second drawing process as shown in FIG. 11B, it becomes possible to determine the collision by detecting this phenomenon.

Further, in FIG. 10A, the partial objects PB1, PB2 (the first and second partial objects) are arranged to be the objects which do not overlap with each other when viewed from the viewpoint (the viewpoint at infinity). In this case, the partial objects PB1, PB2 are drawn simultaneously (drawn in the same drawing process sequence) in each of the first and second drawing processes. According to such a method as described above, it is also possible to realize the appropriate collision determination as shown in FIGS. 11A and 11B. Further, by drawing the partial objects PB1, PB2 simultaneously, it is possible to reduce the number of times of the drawing process, and it becomes possible to achieve increase in the speed of the process. Further, it is also possible to arrange that the collision determination is performed on, for example, the first robot using the method shown in FIGS. 10A through 10C, 11A, 11B, and so on, then the first robot is incorporated in the environmental object, and then the collision determination is subsequently performed on the second robot. According to such a method as described above, in the case in which a plurality of robots exists, it becomes possible to realize not only the collision determination between each of the two or more robots and the surrounding structures or the peripheral equipment, but also the collision determination between the robots.

Further, although the case in which the number of target side set around the movable range of the robot is six is explained in FIG. 9 as an example, the present embodiment is not limited thereto. For example, the number of the target sides can appropriately set in accordance with the environment in which the robot operates, and the number of target sides can also be smaller than six.

Further, the setting method of the depth map information and the drawing method of the collision detection target objects are not limited to those explained with reference to FIGS. 6, 7, 8A, 8B, 9, and 10A through 10C, but can be put into practice in variously modified forms. Further, the collision determination process based on the result of the first and second drawing processes is also not limited to the comparison process of the images and the comparison process of the drawn pixel counts explained with reference to FIGS. 11A and 11B, but can be put into practice in variously modified forms.

4. Detailed Process

Figure 12:
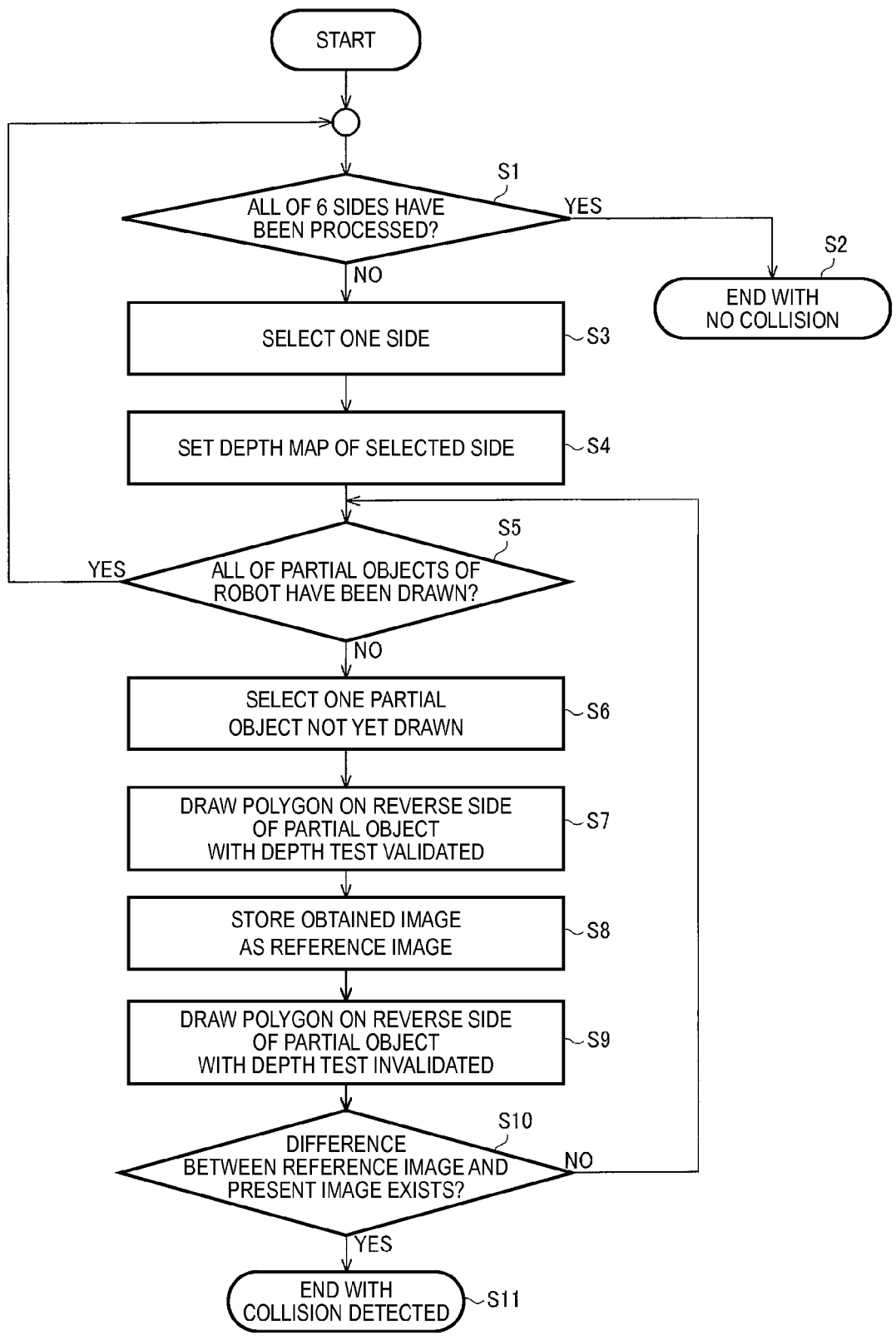
FIG. 12 is a flowchart for showing a detailed process of the present embodiment.
Figure 13:
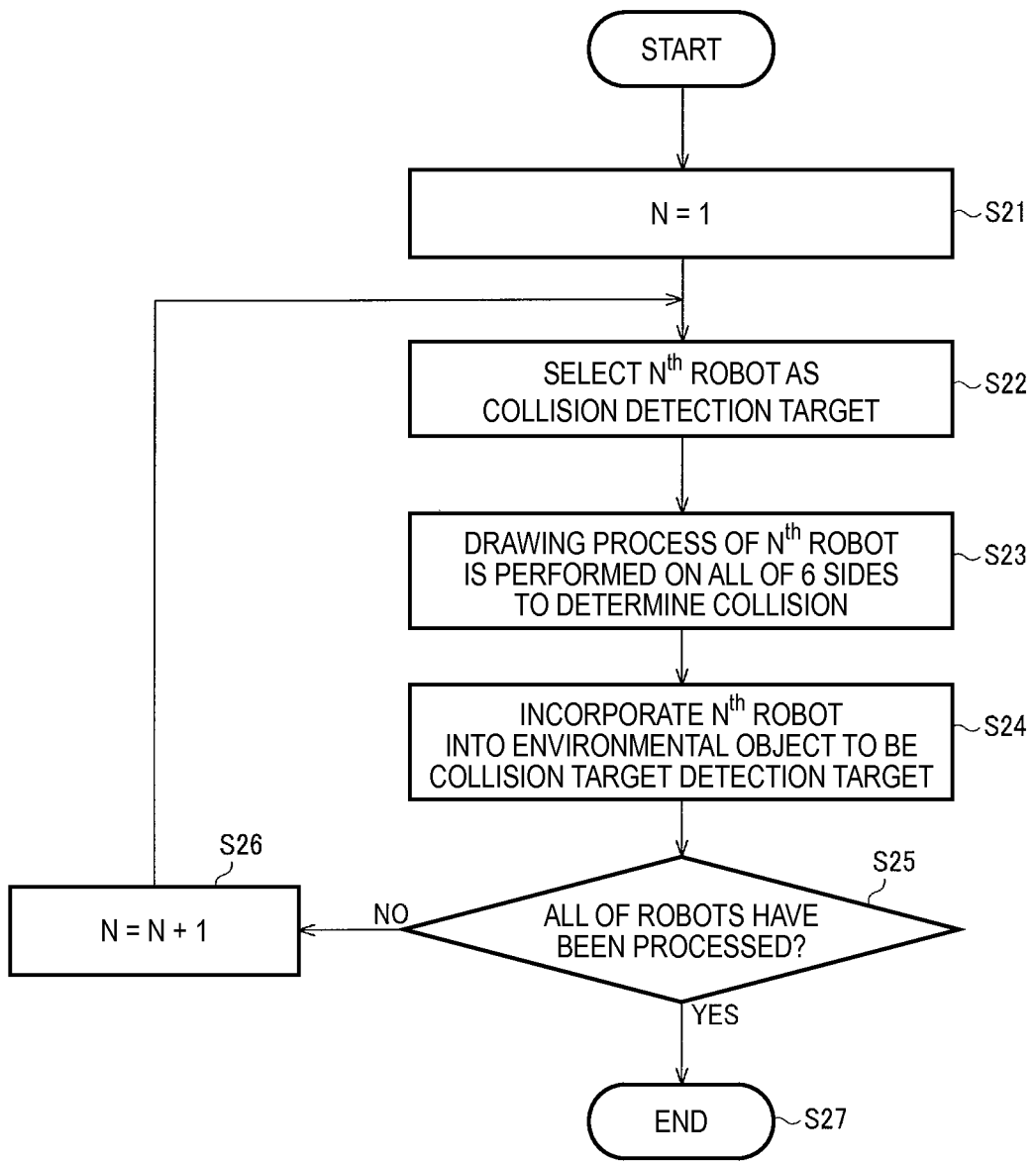
FIG. 13 is a flowchart for showing a detailed process of the present embodiment.

Then, a detailed process example of the present embodiment will be explained using the flowcharts shown in FIGS. 12 and 13. Firstly, as shown in FIG. 12, whether or not all of the six sides (the sides SF1 through SF6 shown in FIG. 9) have been processed is determined (step S1). Then, if the process on all of the six sides has been completed, and no collision has been detected, the process is terminated with the result of no collision (step S2).

In contrast, if the process on all of the six sides has not yet been completed, one of the sides on which the process has not yet been completed is selected (step S3). Then, the depth map of the side thus selected is set to the depth buffer 56 (step S4). For example, the depth map DPM1 of the side SF1 shown in FIG. 8A is set, or the depth map DPM2 of the side SF2 shown in FIG. 8B is set.

Then, whether or not all of the partial objects (the parts) of the robot have been drawn is determined (step S5), and then one of the partial objects not yet drawn is selected (step S6) if the drawing has not yet been completed. It should be noted that the partial objects PB1, PB2 not overlapping with each other when viewed from the viewpoint as shown in FIGS. 10A and 10B are selected as one partial object. Then, as explained with reference to FIG. 10A, the polygons on the reverse surface of the partial object thus selected are drawn with the depth test validated, and then the image thus obtained is stored as the reference image (steps S7, S8).

Subsequently, the polygons on the reverse surface of the partial object thus selected are drawn (step 9) with the depth test invalidated. Then, whether or not there is a difference between the reference image stored in the step S8 and the present image thus generated in the step S9 is determined, and if there is a difference, the process is terminated with the result that the collision exists (steps S10, S11). In contrast, if there is no difference, the process returns to the step S5, and the selection of the next partial object and so on will be performed. FIG. 13 shows the flowchart representing the collision determination process in the case in which a plurality of robots exists.

Firstly, N=1 is set (step S21). Subsequently, the N-th robot is selected (step S22) as the collision detection target. Then, on all of the six sides, the drawing process of the N-th robot is performed to thereby perform (step S23) the collision determination. In other words, the collision determination explained with reference to FIG. 12 is performed.

Subsequently, the N-th robot on which the collision determination has been performed is incorporated (step S24) in the environmental object to be the collision target detection target. Further, whether or not all of the robots have been processed is determined (step S25), and if the process has not yet been completed, then N is incremented by one (step S26), and the process returns to the step S22. On the other hand, if all of the robots have been processed, the process is terminated (step S27).

It should be noted that although the present embodiment is hereinabove explained in detail, it should easily be understood by those skilled in the art that various modifications not substantially departing from the novel matters and the effects of the invention are possible. Therefore, such modified examples should be included in the scope of the invention. For example, a term described at least once with a different term having a broader sense or the same meaning in the specification or the accompanying drawings can be replaced with the different term in any part of the specification or the accompanying drawings. Further, all of the combinations of the present embodiment and the modified examples are also be included in the scope of the invention. Further, the configuration and the operation of the collision detection system and the robot system, the setting method of the depth map information, the drawing method of the collision detection target object, the collision determination method of the collision detection target object, and so on are not limited to those explained in the present embodiment, but can be put into practice in variously modified manners.

What is claimed is:

1. A robot controller comprising:
    a drawing section configured to perform first and second drawing processes;
    a collision detection section configured to detect that a collision detection target object collided with a first object; and
    a processor configured to perform as the drawing section and the collision detection section, wherein
    the first drawing process is based on depth map information of the collision detection target object so as to provide a first result,
    the second drawing process is not based on the depth map information of the collision detection target object so as to provide a second result, and
    the collision detection section detects whether the collision detection target object collided with the first object based on the first and second results and provides a first collision detection result.

2. The robot controller according to claim 1, wherein
    the collision detection target object is configured with a plurality of partial objects including first and second partial objects, and
    the first and second drawing processes are configured to draw the first and second partial objects, respectively, at the same time so as to provide a partial object result.

3. The robot controller according to claim 1, wherein
    the collision detection target object is configured with a plurality of collision detection target objects including first and second collision detection target objects,
    after the collision detection section detects whether the first collision detection target object collided with the object, the first collision detection target object is set as a second target, and
    the collision detection section detects whether the second collision detection target object collided with the second object and provides a second collision detection result.

4. The robot controller according to claim 1, wherein
    the depth map information has first through Nth depth map information corresponding respectively to first through Nth target surfaces that enclose the collision detection target object, in which N denotes an integer equal to or greater than two,
    the first drawing process is based on each of the first through Nth depth map information with respect to each of the first and Nth target surfaces so as to provide a third result,
    the second drawing process is not based on the each of the first through Nth depth map information with respect to the each of the first and Nth target surfaces so as to provide a fourth result, and
    the collision detection section detects whether the collision detection target object collided with the first object based on the third and fourth results and provides a second collision detection result.

5. The robot controller according to claim 1, further comprising:
    a comparison section configured to compare a first image generated by the first drawing process and a second image generated by the second drawing process so as to provide a comparison result.

6. The robot controller according to claim 5, wherein
    the collision detection target object is configured with a plurality of partial objects including first and second partial objects, and
    the first and second drawing processes are configured to draw the first and second partial objects, respectively, at the same time so as to provide a partial object result.

7. The robot controller according to claim 5, wherein
    the collision detection target object is configured with a plurality of collision detection target objects including first and second collision detection target objects,
    after the collision detection section detects whether the first collision detection target object collided with the object, the first collision detection target object is set as a second target, and
    the collision detection section detects whether the second collision detection target object collided with the second object and provides a second collision detection result.

8. The robot controller according to claim 5, wherein
    the depth map information has first through Nth depth map information corresponding respectively to first through Nth target surfaces that encloses the collision detection target object, in which N denotes an integer equal to or greater than two,
    the first drawing process is based on each of the first through Nth depth map information with respect to each of the first and Nth target surfaces so as to provide a third result,
    the second drawing process is not based on the each of the first through Nth depth map information with respect to the each of the first and Nth target surfaces so as to provide a fourth result, and
    the collision detection section detects whether the collision detection target object collided with the first object based on the third and fourth results and provides a second collision detection result.

9. The robot controller according to claim 1, further comprising:
    a comparison section configured to compare first drawn pixel count information according to the first drawing process and second drawn pixel count information according to the second drawing process so as to provide a comparison result.

10. The robot controller according to claim 9, wherein
    the collision detection target object is configured with a plurality of partial objects including first and second partial objects, and
    the first and second drawing processes are configured to draw the first and second partial objects, respectively, at the same time so as to provide a partial object result.

11. The robot controller according to claim 9, wherein
    the collision detection target object is configured with a plurality of collision detection target objects including first and second collision detection target objects, after the collision detection section detects whether the first collision detection target object collided with the object, the first collision detection target object is set as a second target, and
the collision detection section detects whether the second collision detection target object collided with the second object and provides a second collision detection result.

12. The robot controller according to claim 9, wherein
the depth map information has first through Nth depth map information corresponding respectively to first through Nth target surfaces that encloses the collision detection target object, in which N denotes an integer equal to or greater than two,
the first drawing process is based on each of the first through Nth depth map information with respect to each of the first and Nth target surfaces so as to provide a third result,
the second drawing process is not based on the each of the first through Nth depth map information with respect to the each of the first and Nth target surfaces so as to provide a fourth result, and
the collision detection section detects whether the collision detection target object collided with the first object based on the third and fourth results and provides a second collision detection result.

13. A robot comprising:
a body; wherein
the body is controlled by the robot controller according to claim 1.

14. A robot comprising:
a body that is controlled by a robot controller wherein
the robot controller includes:
 a drawing section configured to perform first and second drawing processes;
 a collision detection section configured to detect that a collision detection target object collided with a first object; and
 a processor configured to perform as the drawing section and the collision detection section, wherein
the first drawing process is based on depth map information of the collision detection target object so as to provide a first result,
the second drawing process is not based on the depth map information of the collision detection target object so as to provide a second result, and
the collision detection section detects whether the collision detection target object collided with the first object based on the first and second results and provides a first collision detection result.

* * * * *